US012781942B2

(12) United States Patent
Eom et al.

(10) Patent No.: US 12,781,942 B2
(45) Date of Patent: Nov. 3, 2026

(54) LIGHTING DEVICE AND VEHICLE LAMP

(71) Applicant: LG INNOTEK CO., LTD., Seoul (KR)

(72) Inventors: Dong Il Eom, Seoul (KR); Min Soo Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 19/122,319

(22) PCT Filed: Oct. 26, 2023

(86) PCT No.: PCT/KR2023/016797
§ 371 (c)(1),
(2) Date: Apr. 18, 2025

(87) PCT Pub. No.: WO2024/091039
PCT Pub. Date: May 2, 2024

(65) Prior Publication Data

US 2026/0153215 A1 Jun. 4, 2026

(30) Foreign Application Priority Data

Oct. 26, 2022 (KR) ........................ 10-2022-0139647
Oct. 25, 2023 (KR) ........................ 10-2023-0143729

(51) Int. Cl.
*F21S 43/14* (2018.01)
*F21S 43/20* (2018.01)
*F21V 7/00* (2006.01)

(52) U.S. Cl.
CPC ............. *F21S 43/281* (2024.05); *F21S 43/14* (2018.01); *F21V 7/0083* (2013.01)

(58) Field of Classification Search
CPC ............................... F21V 7/0083; F21S 43/14
See application file for complete search history.

(56) References Cited

U.S. PATENT DOCUMENTS

2011/0051397 A1* 3/2011 Bae ...................... G02B 6/0021 362/235
2011/0249215 A1 10/2011 Jung et al.
(Continued)

FOREIGN PATENT DOCUMENTS

JP 2008-059786 3/2008
JP 2012-174634 9/2012
(Continued)

OTHER PUBLICATIONS

International Search Report dated Jan. 30, 2024 issued in Application No. PCT/KR2023/016797.
(Continued)

*Primary Examiner* — Sean P Gramling
(74) *Attorney, Agent, or Firm* — KED & ASSOCIATES, LLP

(57) ABSTRACT

A lighting device disclosed in an embodiment of the invention comprises: a substrate; a resin layer disposed on the substrate; a plurality of light emitting devices sealed in the resin layer and electrically connected to the substrate; an optical film disposed on the resin layer; an adhesive layer disposed between the optical film and the resin layer; and a plurality of light blocking members including a light blocking pattern disposed on a lower surface of the optical film and including at least a portion of which vertically overlaps each of the plurality of light emitting devices, each of the plurality of light emitting devices including an emission surface that emits light to one side, and a upper surface area of each of the plurality of light blocking members is in a range of 6 to 10 times the upper surface area of each of the plurality of light emitting devices, and a light uniformity on the optical film may be 80% or more.

20 Claims, 5 Drawing Sheets

(56) References Cited

U.S. PATENT DOCUMENTS

| | | | |
|---|---|---|---|
| 2012/0147277 A1 | 6/2012 | Yamamoto et al. | |
| 2012/0218752 A1 | 8/2012 | Sumitani | |
| 2020/0183230 A1 | 6/2020 | Ryu et al. | |
| 2020/0300444 A1* | 9/2020 | Lee | F21V 13/08 |
| 2022/0246807 A1 | 8/2022 | Chae | |
| 2023/0135095 A1 | 5/2023 | Choi | |
| 2023/0358384 A1 | 11/2023 | Choi et al. | |
| 2024/0088106 A1 | 3/2024 | Choi | |
| 2024/0302016 A1 | 9/2024 | Ahn et al. | |
| 2024/0313188 A1 | 9/2024 | Choi et al. | |

FOREIGN PATENT DOCUMENTS

| | | | |
|---|---|---|---|
| KR | 10-2011-0032476 | 3/2011 | |
| KR | 10-2014-0059448 | 5/2014 | |
| KR | 10-2022-0026137 | 3/2022 | |
| KR | 10-2022-0122027 | 9/2022 | |
| KR | 20220122027 A * | 9/2022 | H10W 90/00 |
| WO | WO 2021/187843 | 9/2021 | |
| WO | WO 2022/173214 | 8/2022 | |
| WO | WO 2022/191682 | 9/2022 | |

OTHER PUBLICATIONS

Extended European Search Report dated Mar. 27, 2026 issued in Application No. 23883144.0.

* cited by examiner

【FIG. 1】
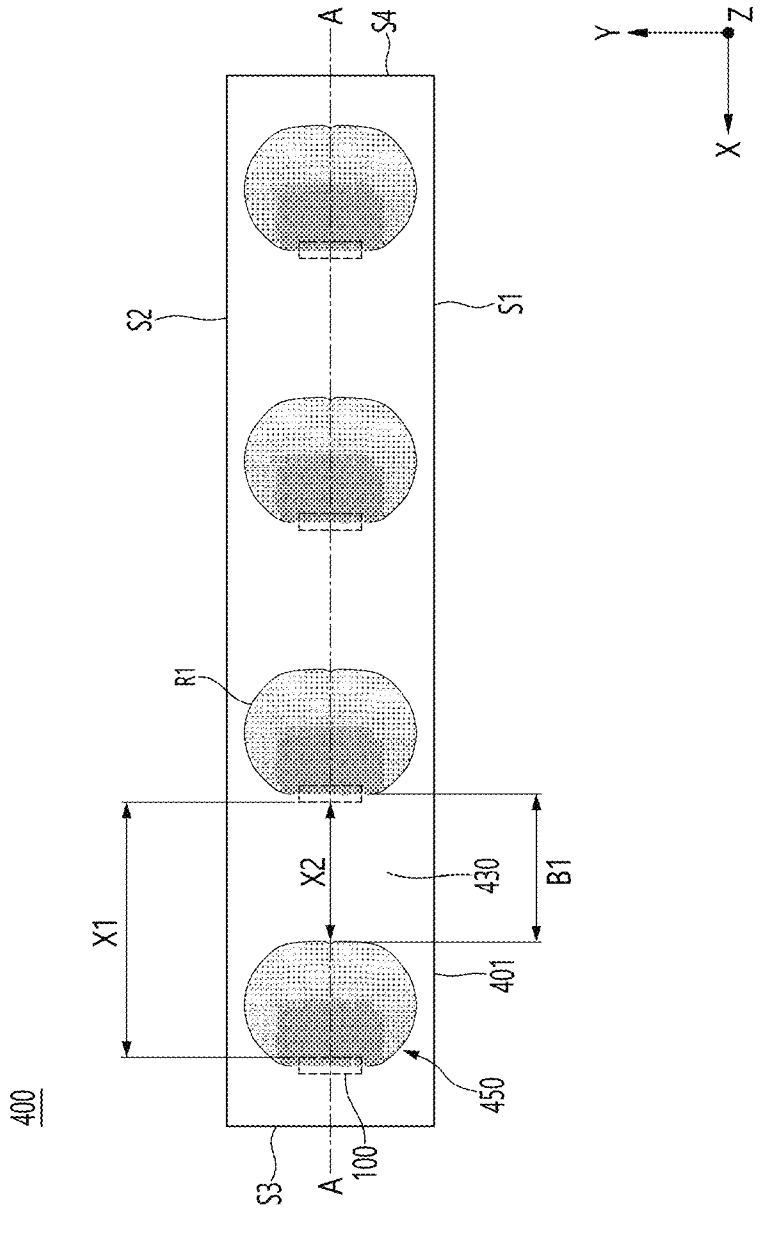

【FIG. 2】
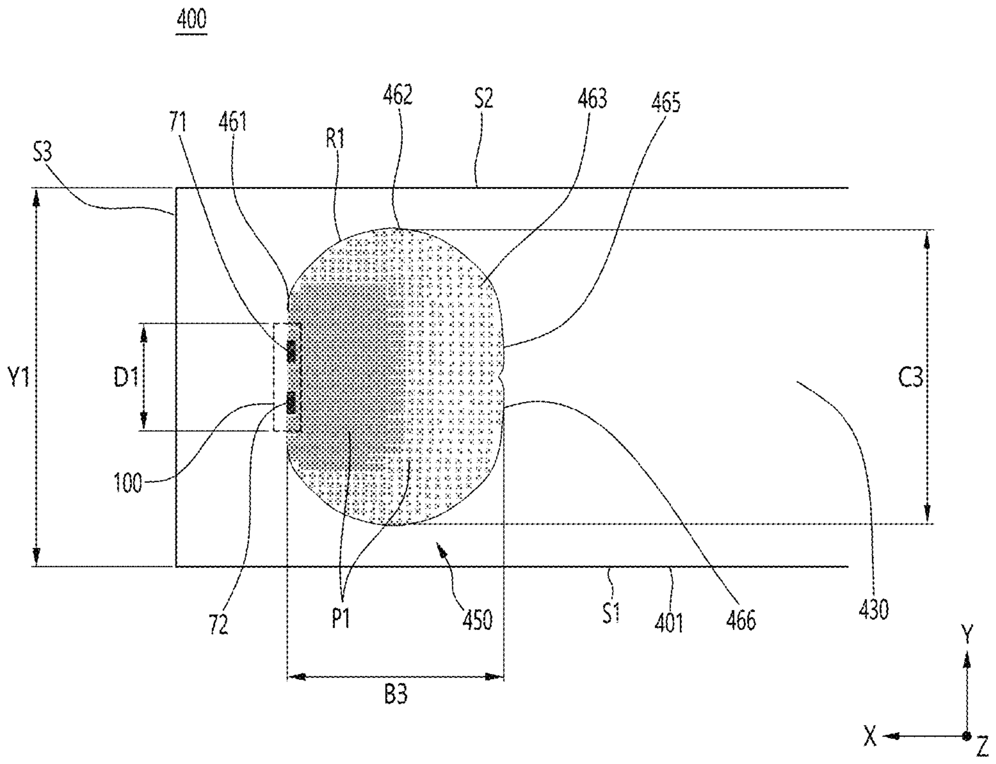

【FIG. 3】
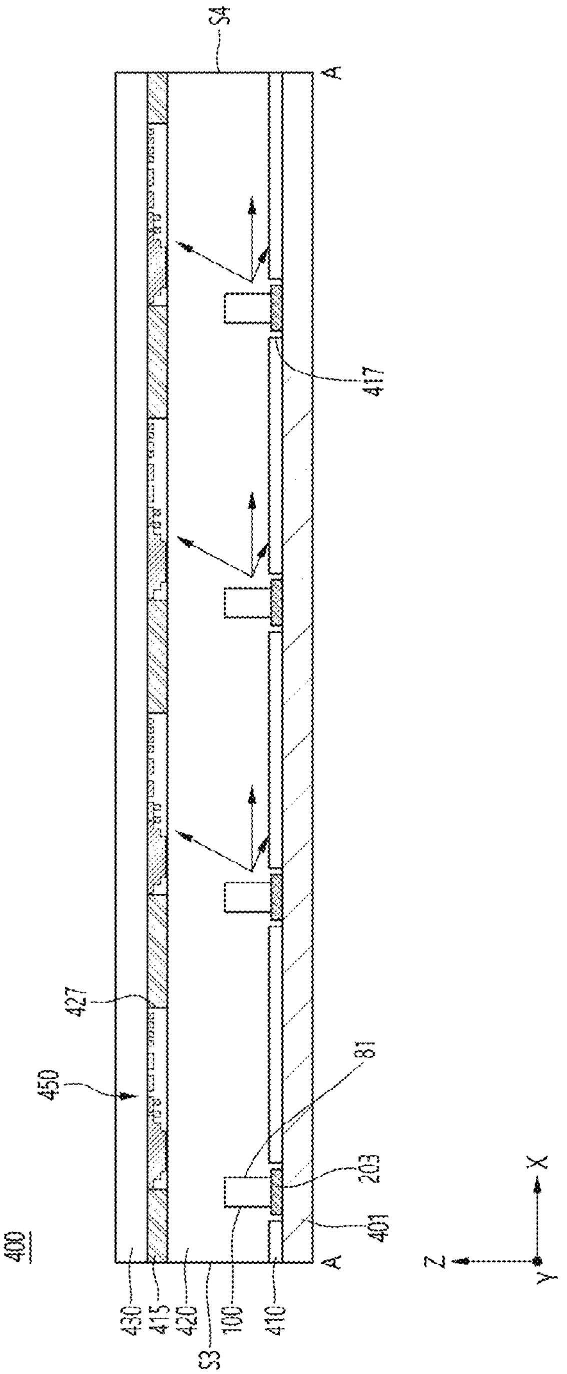

【FIG. 4】
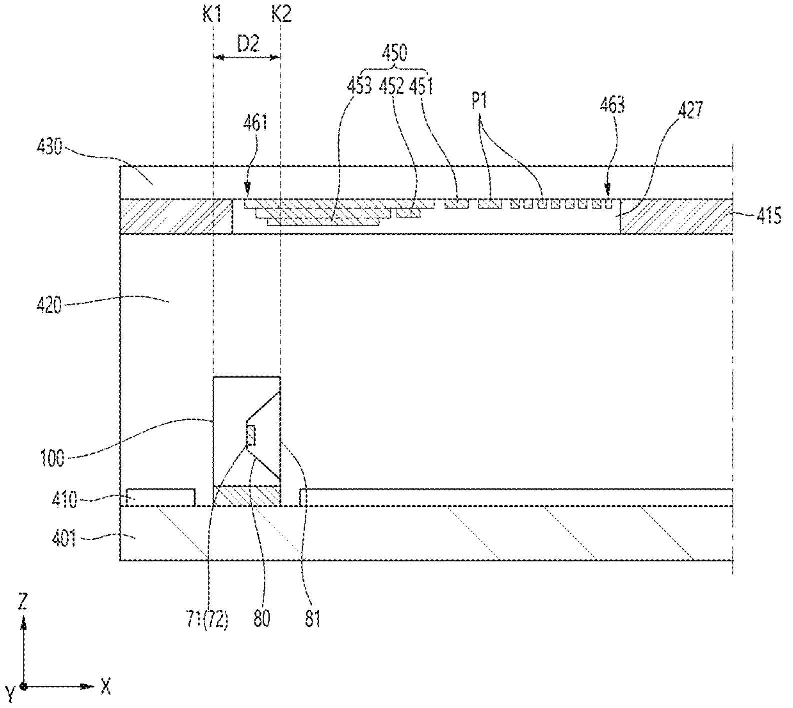
【FIG. 5】
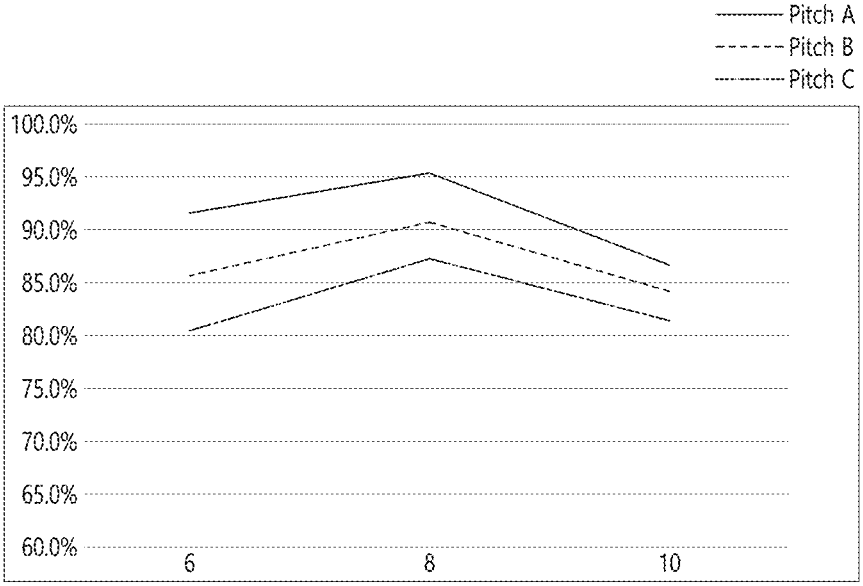

【FIG. 6】
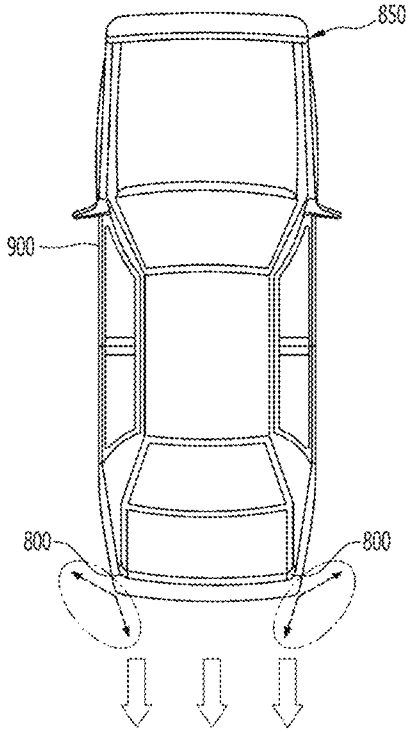
【FIG. 7】
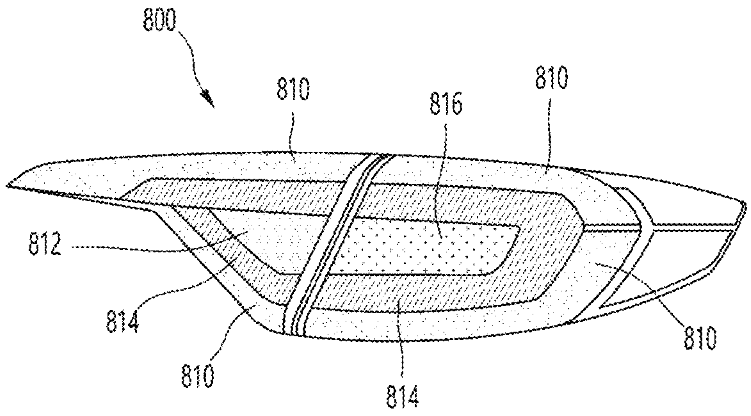

LIGHTING DEVICE AND VEHICLE LAMP

CROSS-REFERENCE TO RELATED PATENT APPLICATIONS

This application is a U.S. National Stage Application under 35 U.S.C. § 371 of PCT Application No. PCT/KR2023/016797, filed Oct. 26, 2023, which claims priority to Korean Patent Application Nos. 10-2022-0139647 filed Oct. 26, 2022, and 10-2023-0143729 filed Oct. 25, 2023, whose entire disclosures are hereby incorporated by reference.

TECHNICAL FIELD

An embodiment of the invention relates a lighting device and a vehicle lamp.

BACKGROUND ART

Lighting applications include vehicle lights as well as backlights for displays and signs. Light emitting device, such as light emitting diode (LED), have advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights.

Recently, as a vehicle light source, a lamp employing a light emitting diode has been proposed. Compared with incandescent lamps, light emitting diodes are advantageous in that power consumption is small. However, since an emission angle of light emitted from the light emitting diode is small, when the light emitting diode is used as a vehicle lamp, there is a demand for increasing the light emitting area of the lamp using the light emitting diode. Since the light emitting diode is small, it may increase the design freedom of the lamp, and it is economical due to its semi-permanent life.

DISCLOSURE

Technical Problem

An embodiment of the invention may provide a lighting device for providing a uniform surface light distribution.

An embodiment of the invention can provide a lighting device having a uniform surface light distribution by optimizing an area of a light emitting device and an area of a light blocking member.

Technical Solution

A lighting device according to an embodiment of the invention includes a substrate; a resin layer disposed on the substrate; a plurality of light emitting devices sealed in the resin layer and electrically connected to the substrate; an optical film disposed on the resin layer; an adhesive layer disposed between the optical film and the resin layer; and a plurality of light blocking members including a light blocking pattern disposed on a lower surface of the optical film and including at least a portion of which overlaps each of the plurality of light emitting devices in a vertical direction, wherein each of the plurality of light lighting devices includes an emission surface that emits light to one side, and an upper surface area of each of the plurality of light blocking members is in a range of 6 to 10 times an upper surface area of each of the plurality of light emitting devices, and a light uniformity on the optical film may be 80% or more.

According to an embodiment of the invention, the lighting device comprises an air gap portion disposed between each of the plurality of light blocking members and the resin layer, and a lower surface area of the air gap portion may be in a range of 6 to 10 times the area of the upper surface of each of the plurality of light emitting devices.

According to an embodiment of the invention, an interval between adjacent light blocking members and the light emitting devices may be in a range of 0.15 to 0.55 times a pitch between the light emitting devices.

According to an embodiment of the invention, the pitch between the light emitting devices may be in a range of 17 to 23 mm.

According to an embodiment of the invention, the light uniformity may be the highest when the upper surface area of each of the light blocking members is 8 times the upper surface area of each of the light emitting devices.

According to an embodiment of the invention, the pitch between the light emitting devices may be 18 mm±1 mm.

According to an embodiment of the invention, the upper surface area of each of the plurality of light blocking members may be in the range of 6 to 10 times the emission surface area of each of the plurality of light emitting devices.

According to an embodiment of the invention, each of the light emitting devices emits light in a first direction, a length of each of the light emitting devices in a second direction is greater than a length of the first direction, the length of each of the light emitting devices in the second direction is D1, a length of each of the light blocking members in the second direction is C3, and the following condition may satisfy: $2<C3/D1<3$.

A vehicle lamp according to an embodiment of the invention includes a lamp having the lighting device disclosed above, and the lamp may include at least one of a side mirror light, a side light, a fog light, a tail light, a brake light, a daytime running light, a vehicle interior light, a door scarf, a rear combination lamp, and a backup lamp.

Advantageous Effects

According to an embodiment of the invention, a lighting device and a lamp can have improved light characteristics. Specifically, a hot spot caused by light emitted from light emitting devices can be prevented by a light blocking member disposed on a resin layer, and a uniform light distribution can be provided.

According to an embodiment of the invention, a uniform surface light distribution can be achieved by optimizing the pitch between light emitting devices and the area of the light blocking member, thereby improving light uniformity and light blocking effect.

According to an embodiment of the invention, a lighting device or a vehicle lamp having a resin layer covering a light emitting device in which a light emitting chip is molded and a light blocking pattern on the resin layer can be improved in reliability.

DESCRIPTION OF DRAWINGS

FIG. 1 is an example of a plan view of a lighting device according to an embodiment of the invention.

FIG. 2 is an example of a partial enlarged view of the lighting device of FIG. 1.

FIG. 3 is an example of an A-A side cross-sectional view of the lighting device of FIG. 1.

FIG. 4 is a partial enlarged view of the lighting device of FIG. 3.

FIG. 5 is a graph comparing an area of a light blocking member and light uniformity with respect to an area of a light emitting device according to a pitch between the light emitting devices in a lighting device according to an embodiment of the invention.

FIG. 6 is a drawing showing a lamp having a lighting device according to an embodiment of the invention.

FIG. 7 is a plan view of a vehicle to which the vehicle lamp of FIG. 6 is applied.

BEST MODE

Hereinafter, preferred embodiment of the invention will be described in detail with reference to the accompanying drawings.

The technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is “connected”, “coupled” or “joined” to another component, the description may include not only being directly connected, coupled or joined to the other component but also being “connected”, “coupled” or “joined” by another component between the component and the other component. In addition, in the case of being described as being formed or disposed “above (on)” or “below (under)” of each component, the description includes not only when two components are in direct contact with each other, but also when one or more other components are formed or disposed between the two components. In addition, when expressed as “above (on)” or “below (under)”, it may refer to a downward direction as well as an upward direction with respect to one element.

The lighting device according to the invention may be applied to a variety of lamp devices that require lighting, such as vehicle lamps, home lighting devices, or industrial lighting devices. For example, when applied to vehicle lamps, it is applicable to headlamps, sidelights, side mirrors, fog lights, tail lamps, brake lights, daytime running lights, vehicle interior lights, door scars, rear combination lamps, backup lamps, etc. The lighting device of the invention may be applied to indoor and outdoor advertising devices, display devices, and various electric vehicle fields, and in addition, it may be applied to all lighting-related fields or advertisement-related fields that are currently developed and commercialized or that may be implemented according to future technological developments.

FIG. 1 is an example of a plan view of a lighting device according to an embodiment of the invention, FIG. 2 is an example of a partial enlarged view of the lighting device of FIG. 1, FIG. 3 is an example of an A-A side cross-sectional view of the lighting device of FIG. 1, FIG. 4 is a partial enlarged view of the lighting device of FIG. 3, and FIG. 5 is a graph comparing an area of a light blocking member and light uniformity with respect to an area of a light emitting device according to a pitch between the light emitting devices in a lighting device according to an embodiment of the present invention.

Referring to FIGS. 1 to 4, a lighting device 400 according to an embodiment of the invention may include a substrate 401, a plurality of light emitting devices 100, a resin layer 420, a plurality of light blocking members 450, and an optical film 430. An optical plate may include the optical film 430 and the plurality of light blocking members 450, and the light blocking members 450 may be formed on the upper or lower surface of the optical film 430. The lighting device 400 may be defined as a lighting module or a light emitting module.

The lighting device 400 may include a reflective member 410 disposed between the substrate 401 and the resin layer 420. The lighting device 400 may emit light emitted from the plurality of light emitting devices 100 as surface light. The lighting device 400 may be defined as a light emitting cell or a light source module. The lighting device 400 may include one light emitting cell or a plurality of light emitting cells on the substrate 401. Here, the lighting device 400 may include first and second side surfaces S1 and S2 on opposite sides of the second direction Y, and third and fourth side surfaces S3 and S4 on opposite sides of the first direction X. The first and second side surfaces S1 and S2 may face each other, and may be opposite sides of the substrate 401 and the resin layer 420. The third and fourth side surfaces S3 and S4 may face each other, and may be different sides of the substrate 401 and the resin layer 420. The resin layer 420 covers a plurality of light emitting devices 100, guides light emitted from each light emitting device 100, and emits the guided light in the form of surface light through the upper surface. The resin layer 420 may remove the light guide plate such as a transparent acrylic (e.g., PMMA) material and use a resin material such as silicone or epoxy with a thin thickness as a light guide member.

The substrate 401 may include a printed circuit board (PCB). The substrate 410 may include at least one of a resin-based PCB, a metal core PCB, a flexible material PCB, a ceramic material PCB, or an FR-4 substrate, for example. When the substrate 401 is disposed as a metal core PCB with a metal layer arranged on a bottom, a heat dissipation efficiency of the light emitting device 100 can be improved. The substrate 401 may be electrically connected to the plurality of light emitting devices 100. The substrate 401 includes a wiring layer (not shown) on the upper side, and the wiring layer may be electrically connected to a plurality of light emitting devices 100. The plurality of light emitting devices 100 may be connected in series, in parallel, or in series-parallel by the wiring layer. The substrate 401 may function as a base member or a support member arranged below the plurality of light emitting devices 100 and the resin layer 420. The substrate 401 may be provided as a transparent material or an opaque material. When the substrate 401 is a transparent material, light emitted from the light emitting devices 100 may be extracted to the lower side of the substrate 401. The substrate 401 may include an insulating layer (not shown) covering the wiring layer, and the insulating layer may be implemented in white, in which case a reflection function may be implemented without a reflective member 410.

The upper surface of the substrate 401 may be a flat plane or a curved surface. The thickness of the substrate 401 may be a height in the vertical direction or the Z direction. The substrate 401 may have a long bar shape in one direction, a polygonal shape, or a curved shape depending on the shape of the lamp or lighting device 400. The substrate 401 may have a long length in a first direction X in which light is emitted, or a long length in a second direction Y orthogonal to the direction in which the light is emitted. In the drawing, the X direction may be the first direction, the Y direction may be the second direction, and the Z direction may be a direction orthogonal to the first and second directions. The length of the substrate 401 in the first direction X may be larger or smaller than the width in the second direction Y. In addition, a side surface (e.g., S1, S2) in the longitudinal direction of the substrate 401 may be a flat plane or a curved surface. The substrate 401 may include, for example, a reflective member 410. The reflective member 410 may be an insulating layer that protects a circuit pattern having pads arranged on the substrate 401 or a layer of reflective material.

The plurality of light emitting devices 100 are arranged on the substrate 401 and emit light in a first direction X. The plurality of light emitting devices 100 may be disposed in one row or two rows. The light emitting devices 100 may be disposed in an M×N matrix on the substrate 401, and M and N may be integers greater than or equal to 2. The plurality of light emitting devices 100 may emit light in one direction or in directions facing each other. As another example, each of the plurality of light emitting devices 100 may emit light in a second direction Y. In addition, at least one of the plurality of light emitting devices 100 may emit light in a direction between the first and second directions. As another example, the plurality of light emitting devices 100 may be disposed along both side surfaces S3 and S4 of the substrate 401 and may emit light toward opposite side surfaces S3 and S4. Here, the plurality of light emitting devices 100 may be disposed so as not to face each other but to be misaligned on both side surfaces S3 and S4 of the substrate 401.

The light emitting device 100 may have an emission surface 81 that emits light with the highest light intensity on one side (e.g., S4), and the emission surface 81 may extend, for example, in a third direction Z or in a vertical direction with respect to the horizontal upper surface of the substrate 401. The emission surface 81 may be a vertical plane, or may include a concave surface or a convex surface.

Each of the light emitting devices 100 may include a package having a plurality of light emitting chips 71 and 72 or a package in which at least one light emitting chip is packaged. The light emitting chips 71 and 72 may be molded by a molding member 80. The light emitting chips 71 and 72 may be disposed in a plurality in a direction Y orthogonal to the first direction X, and may include, for example, first light emitting chips 71 and second light emitting chips 72 spaced apart from each other. The emission surface 81 of each of the light emitting devices 100 may be the outer surface of the molding member 80. The molding member 80 may be a transparent resin material such as silicone or epoxy. The light emitting chips 71 and 72 may emit at least one of blue, red, green, ultraviolet (UV), and infrared, and each of the light emitting devices 100 may emit at least one of white, blue, red, green, and infrared. Each of the first and second light emitting chips 71 and 72 may emit the same color or different colors. The material of the molding member 80 may be the same as or different from the material of the resin layer 420.

The light emitting device 100 may be a side view type in which a bottom portion is electrically connected to the substrate 401, but is not limited thereto. As another example, the light emitting device 100 may be an LED chip or a top view package. The emission surface 81 of the light emitting device 100 may be disposed on at least one side other than the upper surface of the light emitting device 100. The emission surface 81 may be a side of the light emitting device 100 that is adjacent to the substrate 401 or a side that is perpendicular to the upper surface of the substrate 401. The emission surface 81 is disposed on a side between the lower surface and the upper surface of the light emitting device 100 and emits light of the highest intensity in the first direction. The emission surface 81 of the light emitting device 100 may be a surface adjacent to the reflective member 410, or may be a surface perpendicular to the upper surface of the substrate 401 or the upper surface of the reflective member 410. An area of the emission surface 81 of each light emitting device 100 may be 120% or less of the upper surface area of the light emitting device 100, for example, 80% to 120% or 80% to 100%. The area of the emission surface 81 of each light emitting device 100 may be 90%±10% of the upper surface area of the light emitting device 100.

Some of the light emitted through the emission surface 81 of the light emitting device 100 may proceed in a direction parallel to the upper surface of the substrate 401, be reflected by the reflective member 410, or may proceed toward the upper surface of the resin layer 420. The thickness of the light emitting device 100 may be, for example, 3 mm or less, for example, in a range of 0.4 mm to 3 mm. The length (D1 of FIG. 2) of the light emitting device 100 in the second direction may be 1.5 times or more the thickness of the light emitting device 100. The light distribution emitted in the first direction X of the light emitting device 100 may have a wider light directivity angle in the ±Y direction than a light directivity angle in the ±Z direction. The light directivity angle of the light emitting device 100 in the second direction may be 110 degrees or more, for example, 120 degrees to 160 degrees or 140 degrees or more. The light beam angle in the third direction of the light emitting device 100 may be 110 degrees or more, for example, in the range of 120 degrees to 140 degrees.

The reflective member 410 may be a layer separately bonded to the upper portion of the substrate 401 or a layer protecting the upper portion of the substrate 401. The reflective member 410 may be disposed between the substrate 401 and the resin layer 420, for example. The reflective member 410 may be provided in the form of a film. The reflective member 410 may be bonded to the upper surface of the substrate 401. The reflective member 410 may have an area smaller than the upper surface area of the substrate 401. The reflective member 410 may be spaced apart from the edge of the substrate 401, and a resin layer 420 may be attached to the substrate 401 in the spaced area. At this time, the edge portion of the reflective member 410 may be prevented from being peeled off. The reflective member 410 may include a plurality of openings 417 in which the lower portions of each light emitting device 100 are arranged. The upper surface of the substrate 401 is exposed through the openings 417 of the reflective member 410, and the lower portions of each light emitting device 100 may be electrically bonded. The size of each opening 417 may be disposed to be equal to or larger than the size of each light emitting device 100. The reflective member 410 may be in contact with the upper surface of the substrate 401 or may be adhered between the resin layer 420 and the substrate 401. Here, the reflective member 410 may be removed when a highly reflective material is coated on the upper surface of the substrate 401.

The reflective member 410 may be formed with a thickness thinner than the thickness of the light emitting device 100. The thickness of the reflective member 410 may include a range of 0.2 mm±0.02 mm. The lower portion of the light emitting device 100 may be penetrated through the opening 417 of the reflective member 410, and the upper portion of the light emitting device 100 may be protruded. The emission surface 81 of each light emitting device 100 may be provided in a direction perpendicular to the upper surface of the reflective member 410.

The reflective member 410 may include a metallic material or a non-metallic material. The metallic material may include a metal such as aluminum, silver, or gold. The non-metallic material may include a plastic material or a resin material. The resin material may be a reflective material, such as a metal oxide such as $TiO_2$, $Al_2O_3$, $SiO_2$, added to silicone or epoxy. The reflective member 410 may be implemented as a single layer or multiple layers, and the light reflection efficiency may be improved by this layer structure. The reflective member 410 according to the embodiment of the invention may increase the amount of light by reflecting incident light so that the light is uniformly distributed.

The resin layer 420 may be disposed on the substrate 401. The resin layer 420 may face or be adhered to the substrate 401. The resin layer 420 may be disposed on the entire upper surface or a portion of the upper surface of the substrate 401. The lower surface area of the resin layer 420 may be equal to or smaller than the upper surface area of the substrate 401. The resin layer 420 may be formed of a transparent material and may guide or diffuse light. The resin layer 420 may include a UV-curable resin material, and may be used instead of a light guide plate, and may have the effect of conveniently controlling the refractive index and thickness. Since the resin layer 420 is provided as a layer that guides light with resin, it may be provided with a thinner thickness than in the case of glass and may be provided as a flexible plate. The resin layer 420 may emit point light sources emitted from each light emitting device 100 in the form of linear light or surface light. The resin layer 420 may include beads (not shown), and the beads may diffuse and reflect incident light, thereby increasing the amount of light. The beads may be disposed in a range of 0.01 to 0.3% relative to the weight of the resin layer 420. The beads may be composed of any one selected from Silicon, Silica, Glass bubble, PMMA (Polymethyl methacrylate), Urethane, Zn, Zr, $Al_2O_3$, and Acryl, and the particle size of the beads may be in the range of about 1 μm to about 20 μm, but is not limited thereto.

The thickness of the resin layer 420 may be 1.8 mm or more, for example, in the range of 1.8 mm to 2.5 mm. If the thickness of the resin layer 420 is thicker than the above range, the brightness may be reduced and it may be difficult to provide a flexible module due to the increase in module thickness. If the thickness of the resin layer 420 is smaller than the above range, it is difficult to provide a surface light source with uniform brightness. The resin layer 420 seals the circumference of each of the plurality of light emitting devices 100, so that each light emitting device 100 may be protected and the loss of light emitted from each light emitting device 100 can be reduced. The upper portion of each light emitting device 100 may be buried in the lower portion of the resin layer 420. The resin layer 420 may be in contact with the surface (e.g., multiple side surfaces and upper surfaces) of each light emitting device 100, so that it may be in contact with the emission surface 81 of each light emitting device 100. A portion of the resin layer 420 may be placed in the opening 417 of the reflective member 410.

The adhesive layer 415 may be an adhesive material such as silicone or epoxy, or may include a diffusion material. The diffusion material may include at least one of polyester (PET), poly methyl methacrylate (PMMA), or poly carbonate (PC). The adhesive layer 415 may be a transparent resin material. The adhesive layer 415 may be adhered to the upper surface of the resin layer 420. The adhesive layer 415 may adhere the optical film 430 to the upper surface of the resin layer 420. The inside of the adhesive layer 415 may include the plurality of light blocking members 450 and the plurality of air gap portions 427. The adhesive layer 415 may be adhered to the outer periphery of each of the light blocking members 450, the lower surface of the optical film 430, and the upper surface of the resin layer 420. The upper surface area of the adhesive layer 415 within the upper surface of the resin layer 420 may be larger than the upper surface area of the light blocking member 450.

The plurality of light blocking members 450 may face the upper surface of the resin layer 420. The plurality of light blocking members 450 may overlap the light emitting devices 100 in a vertical direction or a third direction Z. A portion of each of the plurality of light blocking members 450 may overlap each of the plurality of light emitting devices 100 in a vertical direction. The plurality of light blocking members 450 may be disposed between the resin layer 420 and the optical film 430. The light blocking members 450 may have a light blocking pattern P1 and may be formed on a lower surface of the optical film 430. The optical film 430 may include a plurality of light blocking members 450 printed on a lower surface. As another example, the light blocking members 450 may have a light blocking pattern and may be printed on an upper surface of the optical film 430. The light blocking member 450 has a light blocking pattern and may be formed on the upper surface of the resin layer 430. As another example, when the optical films 430 are arranged in multiples, the light blocking member 450 may be disposed between the multiple optical films and may be formed on the upper surface of the lower optical film or the lower surface of the upper optical film.

The light blocking members 450 may be disposed within the adhesive layer 415. The light blocking members 450 may penetrate the adhesive layer 415 and may be in contact with at least one of the resin layer 420 and the optical film 430. The light blocking member 450 may not be in contact with the adhesive layer 415. An area spaced from the inside of the adhesive layer 415 and/or the upper surface of the resin layer 420 may be defined as an air gap portion 427. The air gap portion 427 may provide a refractive index different from that of the light blocking member 450 and the adhesive layer 415, thereby improving the light diffusion efficiency. The lowermost surface of the light blocking member 450 may be spaced apart from or not in contact with the upper surface of the layer located below, for example, the upper surface of the resin layer 420. The air gap portion 427 may be a vacuum region.

The interval B1 between adjacent light blocking members 450 may be smaller than the interval X1 between adjacent light emitting devices 100. The interval B1 between adjacent light blocking members 450 may be larger than the interval X2 between adjacent light blocking members 450 and light emitting devices 100. The interval X2 between adjacent light blocking members 450 and light emitting devices 100 may be 1 mm or more, and may be smaller than the center length of the light blocking members 450 in the first direction X. The ratio of the interval X1 between adjacent light blocking members 100 and the interval X2 between adjacent light blocking members 450 and light emitting devices 100 may be in the range of 2.5:1 to 3.5:1. By setting each item X1, X2, and B1 at this ratio, the light uniformity by the shading area may be improved. Each light blocking member 450 may be spaced apart from the upper surface of the resin layer 420. Each light blocking member 450 may be spaced apart from the outer side surface of the adhesive layer 415. A plurality of light blocking members 450 may have the same shape and may be disposed on each light emitting device 100. Each of the light blocking members 450 may be disposed in a region perpendicular to each light emitting device 100, an emission-side region of each light emitting device 100, and both emission-side regions.

The light blocking member 450 may be a region printed with a white material. The light blocking member 450 may be formed of a light blocking material having at least one of a diffusion agent, such as $TiO_2$, $Al_2O_3$, $CaCO_3$, $BaSO_4$, and Silicon, in a resin material. The light blocking member 450 may reflect light emitted through the emission surface 81 of the light emitting device 100, thereby reducing the occurrence of hot spots on the optical film 430 that overlaps the light emitting device 100 in a vertical direction. The light blocking member 450 may print a light blocking pattern P1 using a light blocking material. The light blocking member 450 may be formed in a manner of being printed on the lower surface of the optical film 430. The light blocking member 450 is a material that does not block 100% of incident light, may have a transmittance lower than a reflectance, and may perform the function of light blocking and diffusion. The light blocking member 450 may have a transmittance of less than 12%, for example, in the range of 6% to 11%. If the transmittance of the light blocking member 450 is lower than the above-mentioned range, a dark portion may occur, and if it is higher than the above-mentioned range, light uniformity may deteriorate.

The light blocking member 450 may be formed in a single layer or multiple layers, and may have different pattern shapes depending on the region. The thickness of the light blocking member 450 may have different thicknesses or heights depending on the region. The light blocking member 450 may have the thickest thickness in the region overlapping the emission surface 81 of each light emitting device 100 and the thinnest thickness in the edge region. In the light blocking member 450, the thickness of the region close to the emission surface 81 may be thick and the thickness of the region far from the emission surface 81 may be thin based on the region overlapping the emission surface 81 of the light emitting device 100. The smallest pattern among the patterns P1 of the light blocking member 450 may have a polygonal shape such as a square, a circular shape, or an oval shape. The greatest pattern among the patterns P1 of the light blocking member 450 may have a shape having an area larger than the upper surface area of the light emitting device 100. Here, the greatest pattern may be a pattern layer having the thickest thickness among each light blocking member 450. The light blocking member 450 may be positioned higher than the upper surface of the resin layer 420. The lowermost surface of the light blocking member 450 may be positioned higher than the upper surface of the resin layer 420. The light blocking member 450 may include at least two layers, for example, at least three layers, depending on the thickness or height based on the optical film 430.

The thickness of the light blocking member 450 may be 35 μm or more, for example, in the range of 35 μm to 200 μm. When the thickness of the light blocking member 450 is less than 35 μm, it may be difficult to effectively shield light incident from the lower portion of the light blocking member 450 or the transmittance may increase, resulting in uneven light distribution on the light blocking member 450. In addition, when the thickness of the light blocking member 450 exceeds 200 μm, although it is possible to effectively control the formation of hot spots by light emitted from each of the light emitting devices 100, light emitted from each of the light emitting devices 100 may be lost in the process of passing through the light blocking member 450, resulting in a decrease in overall brightness. Therefore, it is preferable that the thickness of the light blocking member 450 satisfies the above-described range. The minimum thickness of the light blocking member 450 is 35 μm or more, and may satisfy, for example, 35 μm to 50 μm, and preferably, may satisfy a range of 35 μm to 45 μm. If the minimum thickness of the light blocking member 450 is smaller than the above-mentioned range, the range of the transmittance disclosed above may be exceeded and the light uniformity may be degraded, and if it is larger than the above-mentioned range, the range of the transmittance disclosed above may be lowered and a dark portion may occur.

The maximum thickness of the light blocking member 450 is 100 μm or more, and may satisfy, for example, 100 μm to 200 μm, and preferably, may satisfy a range of 110 μm to 150 μm or 110 μm to 130 μm. If the maximum thickness of the light blocking member 450 is smaller than the above-described range, the light may fall outside the range of the transmittance disclosed above and the light uniformity may deteriorate. If it is larger than the above-described range, the light may fall below the range of the transmittance disclosed above and the dark portion may occur. The light blocking member 450 may include a region having an intermediate thickness (i.e., an intermediate layer). The thickness of the intermediate region is 70 μm or more, and may satisfy, for example, 70 μm to 140 μm, and preferably 70 μm to 110 μm or 75 μm to 100 μm. If the intermediate thickness of the light blocking member 450 is smaller than the above-described range, the light may fall outside the range of the transmittance disclosed above and the light uniformity may deteriorate. If it is larger than the above-described range, the light may fall below the range of the transmittance disclosed above and the dark portion may occur. The maximum thickness may be larger than the sum of the minimum thickness and the intermediate thickness.

As shown in FIG. 4, the light blocking member 450 may include a first light blocking portion 451, a second light blocking portion 452, and a third light blocking portion 453. At least one or all of the first to third light blocking portions 451, 452, and 453 may include the light blocking material. The first light blocking portion 451 may have a minimum thickness, the second light blocking portion 452 may have a medium thickness, and the third light blocking portion 453 may have a maximum thickness. The upper surface area of the first light blocking portion 451 may be larger than the upper surface areas of each of the first and second light blocking portions 451 and 452, and preferably, may be larger than the sum of the upper surface areas of the first and second light blocking portions 451 and 452. The light uniformity due to light blocking may be improved by the upper surface area of these light blocking members 451, 452, and 453. Each of the first to third light blocking members 451, 452, and 453 may not overlap each other in the vertical direction. The patterns of each of the first to third light blocking members 451, 452, and 453 may be formed without a rounded upper corner or upper circumference. The uniformity of the patterns of each light blocking member is improved by these light blocking members, and the brightness and luminous flux may be improved. The light blocking member 450 may include light blocking members having different thicknesses for each region. The light blocking member 450 may be formed of the same material with light-blocking members 451, 452, and 453 having different thicknesses.

In The light blocking member 450, the first light blocking portion 451 may include a first region having dense patterns on the emission surface 81 of the light emitting device 100, and a second region having a pattern with density lower than that of the patterns of the first region. The patterns of the first light blocking portion 451 may be disposed around the second and third light blocking portions 452 and 453. The first region having the dense pattern covers the upper portion of the emission surface 81 of the light emitting device 100, thereby improving the distribution of light that passes through the first light blocking portion 451 to the optical film 430. The gap between the patterns of the first and second regions of the first light blocking portion 451 may gradually increase as the distance from the emission surface 81 of the light emitting device 100 increases. The size of each of the patterns of the first region may gradually decrease as the distance from the emission surface 81 of the light emitting device 100 increases. Both sides of the third light blocking portion 453 may be in contact with or separated from the first light blocking portion 451, and one side and the other side may be in contact with or separated from the second light blocking portion 452. The outer side surfaces of the second light blocking portion 452 may be in contact with or separated from the first and third light blocking portions 451 and 453. The emission surface 81 of the light emitting device 100 may vertically overlap with the second and third light blocking portions 452 and 453. The emission surface 81 of the light emitting device 100 may vertically overlap with the light blocking pattern P1. Since the light intensity of light traveling in both directions in the second direction Y based on the light emitting device 100 is at least 50% less than the light intensity in the first direction X, even if the lengths of the second light blocking portion 452 and the third light blocking portion 453 in the second direction Y are set to be the same, a decrease in light blocking efficiency may be prevented.

As shown in FIGS. 1 and 2, when viewed from the top view of the light blocking member 450, the upper surface area of the region formed by the virtual line R1 connecting the outer edges of the upper patterns P1 may be 5 times or more, for example, 5 to 12 times or 6 to 10 times, the upper surface area of the light emitting device 100. The maximum area of the region formed by the virtual line R1 connecting the outer patterns of the light blocking member 450 may be the upper surface area of the light blocking member 450. The upper surface area of the light blocking member 450 may be the area of the region connecting the outer edges of the patterns of the uppermost layer. At this time, the pitch between the light emitting devices may be 15 mm or more, for example, 15 to 25 mm.

The lower surface area of the light blocking member 450 may be the area of the area connecting the outer edges of the patterns of the third light blocking member 453, and may be the minimum area. The lower surface area of each of the light blocking members 450 may be at least 1 time the upper surface area of each of the light emitting devices 100, for example, in the range of 1 to 2.5 times or 1.5 to 2.5 times. Accordingly, the problem of the light emitting device 100 being visible from the outside may be reduced, and hot spots on a region of the light emitting device 100 may be reduced, thereby providing a uniform light distribution over the entire region.

Each of the plurality of light blocking members 450 may include a first edge 461, a second edge 462, and a third edge 463 according to the outer surface area of the patterns P1. The first edge 461 is a region at least partially adjacent to or vertically overlapping each of the light emitting devices 100, the third edge 463 is a region opposite to the first edge 461, and the second edge 462 is a line on both sides of the second direction Y of each of the light blocking members 450 and may have a biconvex shape. The first edge 461 has a virtual straight-line shape, and the third edge 463 has a virtual straight-line shape and may have a straight-line length longer than the straight-line length of the first edge 461. The front of the third edge 463 includes a protruding pattern 465 and 466 protruding forward, and the protruding pattern 465 and 466 may face the light emitting chip 71 and 72 of the light emitting device 100 on a horizontal plane, so that the intensity of light emitted from each light emitting chip 71 and 72 may be reduced.

The convex shape of the second edge 462 of the light blocking member 430 may be convex toward the outside or the second side surface S2 in the area between one end of the first edge 461 and one end of the third edge 463, and may be convex toward the outside or the first side surface S1 in the region between the other end of the first edge 461 and the other end of the third edge 463. The second direction length of the first edge 461 of the light blocking member 450 is disposed to be 0.8 mm or more longer than the length D1 of the light emitting device 100, so as to cover both sides of the emission surface of the light emitting device 100 and prevent a hot spot caused by light emitted from the light emitting device 100. The ratio of the length D1 of the light emitting device 100 and the length C3 of the light blocking member 450 may satisfy the following condition.

$$2 < C3/D1 < 3 \qquad \text{Condition:}$$

If the above condition is satisfied, the light uniformity of the light blocking member 450 and its surroundings can be improved, and if it is smaller than the above-described range, a hot spot may occur or the light uniformity may deteriorate, and if it is larger than the above-described range, light loss or dark portions may occur.

The maximum length C3 of the second direction Y of the light blocking member 450 may vary depending on the length D1 of the light emitting device 100 in the second direction Y. The maximum length C3 may be 9 mm or more, for example, in a range of 9 mm to 20 mm or 10 mm to 18 mm. The maximum length B3 of the light blocking member 450 in the first direction X may be equal to or less than the maximum length C3 of the second direction Y. The maximum length B3 of the light blocking member 450 in the first direction X may be 7 mm or more, for example, in a range of 7 mm to 13 mm. The length of the light blocking member 450 may cover the upper, front, and both sides of the emission surface 81 of the light emitting device 100, prevent hot spots caused by light emitted from the light emitting device 100, and improve light uniformity.

The adhesive layer 415 may be in contact with the outer side of the light blocking member 450 or be spaced apart by an interval of less than 1 mm. A straight line K1 perpendicular to the rear surface of the light emitting device 100 may not overlap with the light blocking member 450. A straight line K2 perpendicular to the front surface (or emission surface) of the light emitting device 100 may overlap with the light blocking member 450 or may overlap with a region having the maximum thickness of the light blocking member 450. The ratio between the length D2 of the light emitting device 100 in the first direction X and the maximum length B3 of the light blocking member 450 in the first direction X may satisfy the following condition.

$$3<B3/D2<7 \text{ or } 4 \le B3/D2 \le 6 \quad \text{Condition:}$$

If the above condition is satisfied, the light uniformity of the light blocking member 450 and its surroundings may be improved, and if it is smaller than the above range, a hot spot may occur or the light uniformity may deteriorate, and if it is larger than the above range, light loss or dark portions may occur.

In FIG. 5 and Table 1, the X-axis represents a configuration in which the upper surface area of the light emitting device is 6 to 10 times larger than the upper surface area of the light emitting device, and the Y-axis represents light uniformity. In this structure, when the upper surface area of the light emitting device 100 is 6 to 10 times larger than the upper surface area of the light emitting device 100, it may be seen that the light uniformity of the lighting device 400 is obtained as 80% or more. In addition, when the upper surface area of the light emitting device 100 is 8 times larger than the upper surface area of the light emitting device 100, it may be seen that the light uniformity of the lighting device 400 is higher than when it is 6 or 10 times larger. The pitch between the light emitting devices may be 15 mm or more, for example, in the range of 15 mm to 25 mm or in the range of 17 mm to 23 mm, and for example, pitch A was measured to be 18 mm±1 mm, pitch B was measured to be 20 mm±1 mm, and pitch C was measured to be 22 mm±1 mm. When the pitch between the light emitting devices is A, B, and C, and the upper surface area of the light blocking member is 6 to 10 times the upper surface area of the light emitting device, it may be seen that the lighting device has a light uniformity of 80% or more. At this time, in the case of the same area of the light blocking member, it may be seen that the light uniformity is higher at pitch A than at pitch B, and the light uniformity is higher at pitch B than at pitch C.

Therefore, when the light uniformity recognized as a uniform surface light source of the lighting device is 80% or more, the upper surface area of each light blocking member relative to the area of each light emitting device may be in the range of 6 to 10 times.

TABLE 1

| X1 (±1 mm) | Upper surface area of light blocking member/Upper surface area of light emitting device | Light uniformity |
|---|---|---|
| 18 mm | 6 times | 91.6% |
| | 8 times | 95.4% |
| | 10 times | 86.6% |
| 20 mm | 6 times | 85.6% |
| | 8 times | 90.7% |
| | 10 times | 84.2% |

TABLE 1-continued

| X1 (±1 mm) | Upper surface area of light blocking member/Upper surface area of light emitting device | Light uniformity |
|---|---|---|
| 22 mm | 6 times | 80.4% |
| | 8 times | 87.3% |
| | 10 times | 81.4% |

In addition, for a light uniformity of 80% or more, the ratio between the pitch X1 between the light emitting devices and the interval X2 between the adjacent light blocking members 450 and the light emitting devices 100 may be set as follows. The interval X2 between the adjacent light blocking members 450 and the light emitting devices 100 may be in the range of 0.15 to 0.55 times the pitch X1 between the light emitting devices. For example, when the upper surface area of the light blocking members 450 is 6 times that of the upper surface area of the light emitting devices 100, the interval X2 between the adjacent light blocking members 450 and the light emitting devices 100 may be 0.45 times or more, for example, in the range of 0.45 to 0.55 times the pitch X1 between the light emitting devices.

When the upper surface area of the light blocking member is 8 times greater than the upper surface area of the light emitting device, the interval X2 between the adjacent light blocking member 450 and the light emitting device 100 may be 0.3 times or more, for example, in the range of 0.3 to 0.45 times, the pitch X1 between the light emitting devices 100. When the upper surface area of the light blocking member is 10 times greater than the upper surface area of the light emitting device, the interval X2 between the adjacent light blocking member 450 and the light emitting device 100 may be 0.35 times or less, for example, in the range of 0.15 to 0.35 times, the pitch X1 between the light emitting devices 100.

Table 2 shows that the light uniformity according to the upper surface area of the light emitting device compared to the upper surface area of the light blocking member, the pitch X1 of the light emitting devices, and the interval X2 (e.g., horizontal distance) between adjacent light emitting devices and the light blocking member may be obtained as follows.

TABLE 2

| X1 (±1 mm) | Upper surface area of light blocking member/Upper surface area of light emitting device | X2 | Light uniformity |
|---|---|---|---|
| 18 mm | 6 times | 8 mm | 91.6% |
| | 8 times | 5.5 mm | 95.4% |
| | 10 times | 3 mm | 86.6% |
| 20 mm | 6 times | 10 mm | 85.6% |
| | 8 times | 7.5 mm | 90.7% |
| | 10 times | 5 mm | 84.2% |
| 22 mm | 6 times | 12 mm | 80.4% |
| | 8 times | 9.5 mm | 87.3% |
| | 10 times | 7 mm | 81.4% |

In addition, the lower surface area of the air gap portion 427 may be the same as or have a difference of 5% or less from the upper surface area of the light blocking member 450, and may have a range of 6 to 10 times the upper surface area of the light emitting device, and the light uniformity according to the pitch of the light emitting devices may be obtained as in Table 3.

TABLE 3

| X1 (±1 mm) | Lower surface area of air gap portion/Upper surface area of light emitting device | Light uniformity |
|---|---|---|
| 18 mm | 6 times | 80% or more |
| | 8 times | |
| | 10 times | |
| 20 mm | 6 times | |
| | 8 times | |
| | 10 times | |
| 22 mm | 6 times | |
| | 8 times | |
| | 10 times | |

In addition, the upper surface area of the light blocking member may be 6 to 10 times larger than the area of the emission surface of the light emitting device, and the light uniformity according to the pitch of the light emitting devices may be obtained as shown in Table 4.

TABLE 4

| X1 (±1 mm) | Upper surface area of light blocking member/Area of emission surface of light emitting device | Light uniformity |
|---|---|---|
| 18 mm | 6 times | 80% or more |
| | 8 times | |
| | 10 times | |
| 20 mm | 6 times | |
| | 8 times | |
| | 10 times | |
| 22 mm | 6 times | |
| | 8 times | |
| | 10 times | |

By these Tables 1 to 4, the items such as the upper surface area of the light blocking member, the lower surface area of the air gap portion, the pitch between the light emitting devices, the upper surface area of the light emitting devices or the area of the emission surface may be optimized so that the light uniformity is 80% or more.

Table 5 is a value measured for the light uniformity in an embodiment of the invention when the pitch between the light emitting devices is 10 mm, 15 mm, 20 mm, or 25 mm and the upper surface area of the light blocking member is 2 to 20 times the upper surface area of the light emitting devices. Based on the measured values of Table 5, when the area of the light blocking member is 2 to 10 times the upper surface area of the light emitting devices, the light uniformity may be obtained as 70% or higher.

TABLE 5

| X1(mm) | Upper surface area of light blocking member/Upper surface area of light emitting device | Light uniformity |
|---|---|---|
| 10 | 2 | 88% |
| 10 | 4 | 89% |
| 10 | 6 | 79% |
| 10 | 8 | 81% |
| 10 | 10 | 95% |
| 10 | 12 | 78% |
| 10 | 14 | 38% |
| 10 | 16 | 0% |
| 10 | 18 | 0% |
| 10 | 20 | 0% |
| 15 | 2 | 61% |
| 15 | 4 | 88% |
| 15 | 6 | 99% |
| 15 | 8 | 97% |
| 15 | 10 | 92% |
| 15 | 12 | 69% |
| 15 | 14 | 34% |
| 15 | 16 | 0% |
| 15 | 18 | 0% |
| 15 | 20 | 0% |
| 20 | 2 | 38% |
| 20 | 4 | 68% |
| 20 | 6 | 86% |
| 20 | 8 | 91% |
| 20 | 10 | 84% |
| 20 | 12 | 64% |
| 20 | 14 | 33% |
| 20 | 16 | 0% |
| 20 | 18 | 0% |
| 20 | 20 | 0% |
| 25 | 2 | 19% |
| 25 | 4 | 52% |
| 25 | 6 | 74% |
| 25 | 8 | 83% |
| 25 | 10 | 79% |
| 25 | 12 | 64% |
| 25 | 14 | 36% |
| 25 | 16 | 0% |
| 25 | 18 | 0% |
| 25 | 20 | 0% |

In addition, even if the upper surface area of the light blocking member is more than twice the upper surface area of the light emitting device, it may be seen that when the pitch between the light emitting devices is 25 mm, the light uniformity is reduced to 50% or less. In addition, when the upper surface area of the light blocking member is more than 10 times the upper surface area of the light emitting device, it may be seen that when the pitch between the light emitting devices is 10 mm, 15 mm, 20 mm, or 25 mm, most of the light uniformity is reduced to 50% or less.

The optical film 430 may be disposed on the resin layer 420. The lower surface of the optical film 430 may have the adhesive layer 415 and the light blocking member 450 arranged. The optical film 430 may have the light blocking member 450 printed on the lower surface, and may be fixed on the resin layer 420 through the adhesive layer 415. The optical film 430 may include at least one of a polyester (PET) film, PMMA (Poly Methyl Methacrylate) material, or PC (Poly Carbonate). The optical film 430 may be provided as a film made of a resin material such as silicone or epoxy. The optical film 430 may include a single layer or multiple layers. As another example, when a lower optical film (not shown) is disposed between the adhesive layer 415 and the resin layer 420, the lower optical film may be adhered to the resin layer 420, and for example, the upper surface of the resin layer 420 may be adhered to the lower optical film by a first adhesive force having fine cilia. At this time, the optical film 430 or/and the lower optical film may be attached to the resin layer 420 by applying a predetermined pressure or pressure/heat.

The thickness of the optical film 430 is 25 μm or more, and may be, for example, in a range of 25 μm to 250 μm or in a range of 100 μm to 250 μm. The optical film 430 can provide incident light with the thickness range as a uniform surface light source. The optical film 430 or/and the lower optical film may include at least one or two or more of a dispersant such as beads, a phosphor, and ink particles. The phosphor may include, for example, at least one of a red phosphor, an amber phosphor, a yellow phosphor, a green phosphor, or a white phosphor. The ink particles may include at least one of a metallic ink, a UV ink, or a curable ink. The size of the ink particles may be smaller than the size of the phosphor. The surface color of the ink particles may be any one of green, red, yellow, and blue. The above ink types may be selectively applied from among PVC (Poly vinyl chloride) ink, PC (Polycarbonate) ink, ABS (acrylonitrile butadiene styrene copolymer) ink, UV resin ink, epoxy ink, silicone ink, PP (polypropylene) ink, water-based ink, plastic ink, PMMA (poly methyl methacrylate) ink, and PS (polystyrene) ink. The ink particles may include at least one of metal ink, UV ink, or curing ink.

In an embodiment of the invention, light diffused by the resin layer 420 may be transmitted through the adhesive layer 415 and emitted as uniform surface light through the optical film 430. At this time, the light blocking member 450 may prevent hot spots caused by the incident light. In another example of the invention, a layer of reflective material or an upper substrate may be placed on the resin layer 420. The reflective material layer or upper substrate may face the upper surface of the resin layer 420, the light emitting devices 100 are arranged in at least one row or column, and each emission surface 81 of the light emitting devices 100 is disposed at the same interval as one side of the resin layer 420, and light may be emitted through one side of the resin layer 420.

Meanwhile, the light blocking member 450 according to the embodiment of the invention may be printed on the surface of the optical film 430. Light blocking patterns are formed by a printing method, and more precise and smaller-sized patterns and larger-sized patterns may be manufactured without loss or clumping. In addition, since desired light blocking patterns are formed according to the design, it is possible to prevent a decrease in the uniformity of the image for each product, to easily control the density of the patterns, and to prevent a decrease in the reliability of the lamp image. The upper surface area of the first light blocking portion 451 may be 5 times or more, for example, 5 to 12 times or 6 to 10 times, the upper surface area of the light emitting device 100. The upper surface area of the first light blocking portion 451 is the upper surface area of an area formed by a virtual line connecting the outer edges of the patterns of the first light blocking portion 451. The upper or lower surface area of the second light blocking portion 452 may be 5 times or less, 2 to 5 times or 2 to 3 times the upper surface area of the light emitting device 100. The upper or lower surface area of the second light blocking portion 452 is the upper or lower surface area of an area within a virtual line connecting the outer edges of the patterns of the second light blocking portion 452. Here, the lower surface or upper surface area of the second light blocking portion 452 also includes an area overlapping with the third light blocking portion 453.

The lower surface area of the third light blocking portion 453 may be 3 times or less, 1.2 to 3 times, or 1.2 to 2.5 times the upper surface area of the light emitting device 100. The upper surface or lower surface area of the third light blocking portion 453 is an area of the upper surface or lower surface of an area within a virtual line connecting the outer edges of the patterns of the third light blocking portion 453. The upper surface area of the third light blocking portion 453 also includes an area overlapping vertically with the second light blocking portion 452. The lower surface area of the second light blocking portion 452 may be smaller than the upper surface area of the first light blocking portion 451 and larger than the lower surface area of the third light blocking portion 453. The first to third shading portions 451, 452, and 453 may provide uniform light transmittance, for example, uniformity of 80% or more, by each pattern or light blocking area.

FIG. 6 is a plan view of a vehicle to which a vehicle lamp 800 and 850 with the lighting module applied according to an embodiment is applied, and FIG. 7 is a drawing showing a vehicle lamp having the lighting module or lighting device disclosed in the embodiment.

Referring to FIGS. 6 and 7, a tail lamp 800 in a vehicle 900 may include a first lamp unit 812, a second lamp unit 814, a third lamp unit 816, and a housing 810. Here, the first lamp unit 812 may be a light source for a turn signal, the second lamp unit 814 may be a light source for a sidelight, and the third lamp unit 816 may be a light source for a brake light, but is not limited thereto. At least one or all of the first to third lamp units 812, 814, and 816 may include a lighting module disclosed in the embodiment. The housing 810 accommodates the first to third lamp units 812, 814, and 816 and may be made of a light-transmitting material. At this time, the housing 810 may have a curve according to the design of the vehicle body, and the first to third lamp units 812, 814, and 816 may implement a surface light source having a curved surface according to the shape of the housing 810. Such a vehicle lamp may be applied to a turn signal lamp of the vehicle when the lamp unit is applied to a tail light, a brake light, or a turn signal lamp of the vehicle.

Features, structures, effects, and the like described in the embodiments above are included in at least one embodiment of the invention, and are not necessarily limited to only one embodiment. Furthermore, the features, structures, effects, and the like illustrated in each embodiment may be combined or modified for other embodiments by a person having ordinary knowledge in the field to which the embodiments belong. Accordingly, contents related to such combinations and modifications should be construed as being included in the scope of the invention. In addition, although the examples have been described above, these are only examples and do not limit the invention, and those of ordinary skill in the field to which the invention pertains are illustrated above within the scope not departing from the essential characteristics of the present embodiment. It will be seen that various modifications and applications that have not been made are possible. For example, each component specifically shown in the embodiment can be modified and implemented. And differences related to these modifications and applications should be construed as being included in the scope of the invention defined in the appended claims.

The invention claimed is:

1. A lighting device comprising:

a substrate;

a resin layer disposed on the substrate;

a plurality of light emitting devices sealed in the resin layer and electrically connected to the substrate;

an optical film disposed on the resin layer;

an adhesive layer disposed between the optical film and the resin layer;

a plurality of light blocking members including a light blocking pattern disposed on a lower surface of the optical film and including at least a portion of which overlaps each of the plurality of light emitting devices in a vertical direction; and an air gap portion disposed between each of the plurality of light blocking members and the resin layer, wherein each of the plurality of light emitting devices includes an emission surface emitting light to one side and is a side-view type package that emits light to one side, wherein each of the plurality of light blocking members has a plurality of light blocking portions having different thicknesses depending on regions and is physically formed as a single layer of the plurality of light blocking portions, wherein each of the plurality of light blocking members has a thickest thickness in a region overlapping the emission surface of each of the plurality of light emitting devices in the vertical direction and a thinnest thickness in an edge region, wherein gaps between the light blocking patterns within the edge region having the thinnest thickness are connected to the air gap portion, wherein an upper surface area of each of the plurality of light blocking members is in a range of 6 to 10 times an upper surface area of each of the plurality of light emitting devices, and wherein a light uniformity of 80% or more on the optical film.

2. The lighting device of claim 1, comprising:

wherein a lower surface area of the air gap portion is in a range of 6 to 10 times the upper surface area of each of the plurality of light emitting devices.

3. The lighting device of claim 1, wherein an interval between adjacent light blocking member and the light emitting device is in a range of 0.15 to 0.55 times a pitch between the light emitting devices.

4. The lighting device of claim 3, wherein a pitch between the light emitting devices is in a range of 17 mm to 23 mm.

5. The lighting device of claim 3, wherein the light uniformity is the highest when the upper surface area of each of the light blocking members is 8 times the upper surface area of each of the light emitting devices.

6. The lighting device of claim 4, wherein the pitch between the light emitting devices is 18 mm+1 mm.

7. The lighting device of claim 3, wherein the upper surface area of each of the plurality of light blocking members is 6 to 10 times an area of the emission surface of each of the plurality of light emitting devices.

8. The lighting device of claim 3, wherein each of the light emitting devices emits light in a first direction, wherein a length of each of the light emitting devices in a second direction is greater than a length in the first direction, wherein the length of each of the light emitting devices in the second direction is CHOI, wherein a length of each of the light blocking members in the second direction is C3, wherein the following condition satisfies: 2<C3/CHOI<3.

9. The lighting device of claim 8, wherein a maximum length of each of the light blocking members in the second direction is in a range of 9 mm to 20 mm.

10. The lighting device of claim 9, wherein a maximum length of each of the light blocking members in the first direction is in a range of 7 mm to 13 mm.

11. The lighting device of claim 8, wherein the adhesive layer has an interval of less than 1 mm from an outer surface of each of the light blocking members.

12. The lighting device of claim 1, wherein each of the plurality of light blocking members includes first to third light blocking portions, wherein the first light blocking portion has a thinnest thickness among thicknesses of the first to third light blocking portions, wherein the third light blocking portion has the thickest thickness among the thicknesses of the first to third light blocking portions, wherein the first to third light blocking portions have different thicknesses and are physically formed a single layer.

13. The lighting device of claim 12, wherein the first light blocking portion has a first region having dense patterns on the emission surface of the light emitting device, and a second region having a pattern with a density lower than that of the patterns of the first region.

14. The lighting device of claim 13, wherein the patterns of the first light blocking portion are arranged around the second and third light blocking portions.

15. The lighting device of claim 14, wherein the first region having the dense pattern covers an upper portion of the emission surface of the light emitting device.

16. The lighting device of claim 14, wherein the gaps are disposed between the patterns of the first and second regions of the first light blocking portion and have a size that gradually increases as a distance from the emission surface of each of the light emitting device increases.

17. The lighting device of claim 16, wherein a size of each of the patterns of the first region gradually decreases as a distance from the emission surface of the light emitting device increases.

18. The lighting device of claim 14, wherein the emission surface of each of the light emitting devices overlaps with the second and third light blocking portions in the vertical direction.

19. The lighting device of claim 14, wherein the upper surface area of each of the light blocking members is an area of a region connecting outer edges of light blocking patterns of an uppermost region, wherein each of the first to third light blocking portions does not overlap with each other in the vertical direction.

20. The lighting device of claim 14, wherein a lower surface area of each of the light blocking members is an area of a region connecting outer edges of patterns of the third light blocking portion, and has a smaller area than a lower surface area of the first and second light blocking portions.

* * * * *